(12) United States Patent
Frost et al.

(10) Patent No.: US 10,987,771 B2
(45) Date of Patent: Apr. 27, 2021

(54) AIR REST BUTTON

(71) Applicant: Carr Lane Manufacturing Co., St. Louis, MO (US)

(72) Inventors: Colin W. Frost, St. Louis, MO (US); Joshua M. Herschbach, Highland, IL (US)

(73) Assignee: Carr Lane Manufacturing Co., St. Louis, MO (US)

( * ) Notice: Subject to any disclaimer, the term of this patent is extended or adjusted under 35 U.S.C. 154(b) by 238 days.

(21) Appl. No.: 15/881,250

(22) Filed: Jan. 26, 2018

(65) Prior Publication Data

US 2019/0232446 A1 Aug. 1, 2019

(51) Int. Cl.
| | | |
|---|---|---|
| *B23Q 1/76* | (2006.01) | |
| *B23Q 1/38* | (2006.01) | |
| *B23Q 3/18* | (2006.01) | |
| *B23Q 17/00* | (2006.01) | |

(52) U.S. Cl.
CPC ............ *B23Q 1/76* (2013.01); *B23Q 1/38* (2013.01); *B23Q 3/18* (2013.01); *B23Q 17/005* (2013.01)

(58) Field of Classification Search
None
See application file for complete search history.

(56) References Cited

U.S. PATENT DOCUMENTS

| | | | | |
|---|---|---|---|---|
| 3,729,185 A | * | 4/1973 | Roeske | B23Q 1/287 269/20 |
| 2012/0098180 A1 | * | 4/2012 | Kawakami | B23Q 1/009 269/20 |

OTHER PUBLICATIONS

Webpage from Halder for Position Sensing Products, https://www.halder.com/eng/Products/Standard-Parts/Machine-and-Fixture-Elements/Positioning-Sensors, printed on Jun. 14, 2018 (2 pages).
Webpage from Jergens for Rest Buttons with Sensor Holes, http://www.jergensinc.com/Threaded-With-x20-And-x20-Without-Sensor-Holes-Rest-Buttons, printed on Jun. 14, 2018 (1 page).

* cited by examiner

*Primary Examiner* — Brian D Keller
(74) *Attorney, Agent, or Firm* — Lewis Rice LLC

(57) ABSTRACT

An air rest button system comprising a body element and a plunger element configured to accept a rest button. The plunger element generally is configured to be inserted into a base in the top of the body element. The plunger element in turn has a bore or hole therein configured to receiving an air rest button, which may be substituted for other air rest buttons, facilitating the modularity of the present system.

9 Claims, 4 Drawing Sheets

AIR REST BUTTON

BACKGROUND OF THE INVENTION

Field of the Invention

This disclosure is related to the field of machining, and more particularly to air rest button used in precision machining.

Description of the Related Art

In manufacturing, often component parts are first separately constructed and then assembled into a final finished product. This basic process has been used for millennia to assemble complex devices from simple components. In the era of interchangeable parts, accuracy and precision are crucial, and there is a need to hold a workpiece in place, and in a predictable orientation and position. It is well known in manufacturing that the quality of machining depends greatly on the precision of the operations, which in turn requires that the workpiece be precisely positioned with respect to the machining equipment, and within accepted manufacturing tolerances.

The need to position and orient a workpiece precisely and consistently is especially true in fixturing, particularly if robotic or computer-controlled equipment is used, such as in computer numeric control (CNC) systems. This is because such systems are built on the assumption that the workpiece has been accurately positioned and oriented in advance, allowing the computer to consistently move to the same physical coordinates in three-dimensional space with each pass. If the workpiece is not properly positioned, then the location of the workpiece will be misaligned with the expectations of the manufacturing system, causing the system to apply operations to the wrong part of the workpiece. Not only can this result in wasted stock as workpieces are improperly worked, but a badly misaligned workpiece can result in damage to the manufacturing equipment itself.

To assist with precise location, a variety of components are used to locate and orient workplaces in three-dimensional space, such as rest pads and rest buttons. Typically, up to three rest buttons may physically contact a workpiece, allowing the workpiece to be held in a known orientation relative to a plane defined by the location of the three rest buttons. Generally, it is not possible to add additional rest buttons to address problems such as minor variations in button depth and manufacturing tolerances, which can result in the workpiece not being correctly oriented or positioned, particularly in detailed work.

In the prior art, this problem is addressed by incorporating error sensing equipment into the rest button. In essence, a hole is inserted into a part of a rest button, and a flow of air is projected through the hole. Due to the location of the path of the hole with respect to the button positioning, the air will escape through the hole if the workpiece is not properly loaded. However, once the workpiece is properly loaded, the hole is obscured and the air can no longer escape, or escapes at a reduced rate detectable by airflow sensors. This allows workers to quickly verify that the workpiece is properly loaded based on the air pressure differential between the unloaded and loaded conditions.

However, in any given environment, most manufacturers have a diverse set of needs for equipment configuration, due to the variety of different types and configurations of workpieces used. Further, it is increasingly common for manufacturers to create their own custom rest buttons. This can result in a need to maintain a large inventory of diverse rest buttons, which in turn result in loss, breakage, inconsistent manufacturing tolerances, and inventory management challenges. Further, because the moveable button portion of the assembly must snuggly correspond to the body portion, manufacturers must maintain not only a wide inventory of buttons, but also a correspondingly large inventory of body elements to facilitate the air flow. What is needed in the art is an air rest button system which facilitates the airflow loading aspects while not requiring a large collection of diverse buttons and bodies.

SUMMARY OF THE INVENTION

The following is a summary of the invention, which should provide to the reader a basic understanding of some aspects of the invention. This summary is not intended to identify critical elements of the invention or in any way to delineate the scope of the invention. The sole purpose of this summary is to present in simplified text some aspects of the invention as a prelude to the more detailed description presented below.

Because of these and other problems in the art, described herein, among other things, is an air rest button system comprising: a body element comprising a top side having axial body bore disposed therein and an opposing bottom side having an axial channel disposed therein; and a plunger element sized and shaped to slide into the axial body bore, the plunger element comprising a top side having an axial plunger bore disposed therein and configured to accept a rest button.

In an embodiment, the air button system further comprises an air supply in fluid communication with the axial channel.

In a further embodiment, the air button system further comprises a pressure sensor in fluid communication with the air supply.

In a further embodiment, the axial body bore is generally cylindrical.

In a further embodiment, the plunger element is generally cylindrical.

In a further embodiment, the top side of the body element further comprises a rim circumscribing the axial body bore and protruding radially towards a center axis thereof.

In a further embodiment, the air button system further comprises a gasket sized and shaped for disposition in the axial body bore above the top of the plunger element and below the underside of the rim.

In a further embodiment, the plunger element comprises a first radius at about a midpoint between the bottom and the top of the plunger element, and a second radius at the top of the plunger element, the second radius being smaller than the first radius and configured to accommodate the gasket disposed between the plunger element and the bore.

In a further embodiment, the radius of the rim is less than the radius of the axial body bore.

Also described herein, among other things, is a method for converting a rest button to an air rest button for holding workpiece for machining: providing a rest button; providing a body element comprising a top side having axial body bore disposed therein and an opposing bottom side having an axial channel disposed therein; providing a plunger element sized and shaped to slide into the axial body bore, the plunger element comprising a top side having an axial plunger bore disposed therein and configured to accept the rest button; installing the body element in a machining base; installing the plunger element in the installed axial body bore; installing the rest button in the installed axial plunger bore; and using the installed rest button, holding a workpiece for machining.

In an embodiment, the method further comprises: providing an air supply in fluid communication with the axial channel; providing a pressure sensor in fluid communication with the air supply; providing a vent in the axial body bore; with the air supply, supplying air to the channel from an air source; the supplied air flowing from the channel to the axial bore and from the axial bore to the atmosphere through the vent; in the holding step, depressing the plunger element to inhibit air flow to the vent; accumulating pressure in the air supply; and with the pressure sensor, detecting the accumulated air pressure.

In an further embodiment, the top side of the body element further comprises a rim circumscribing the axial body bore and protruding radially towards a center axis thereof;

In an further embodiment, the system further comprises: providing a gasket; and after the installing the plunger step, installing the gasket above the top of the installed plunger element and below the underside of the rim.

In an further embodiment, the plunger element comprises a first radius at about a midpoint between the bottom and the top of the plunger element, and a second radius at the top of the plunger element, the second radius being smaller than the first radius and configured to accommodate the gasket disposed between the plunger element and the bore.

Also described herein, among other things, is a system for interchangeably using a plurality of rest buttons with a single air rest button system comprising: a body element comprising a top side having axial body bore disposed therein and an opposing bottom side having an axial channel disposed therein; a first plunger element sized and shaped to slide into the axial body bore, the first plunger element comprising a top side having an axial plunger bore disposed therein configured to accept a rest button having a threaded attaching element having a first thread configuration; and a second plunger element sized and shaped to slide into the axial body bore, the second plunger element comprising a top side having a second axial plunger bore disposed therein configured to accept a rest button having a threaded attaching element having a second thread configuration different from the first thread configuration.

In an embodiment, the top side of the body element further comprises a rim circumscribing the axial body bore and protruding radially towards a center axis thereof.

In an embodiment, the system further comprises a gasket sized and shaped for disposition in the axial body bore above the top of the first plunger element or the second plunger element, and below the underside of the rim.

In an embodiment, the first plunger element and the second plunger element each comprise a first radius at about a midpoint between the bottom and the top and a second radius at the top, the second radius being smaller than the first radius and configured to accommodate the gasket disposed between the each first and second plunger element and the bore.

In an embodiment, the radius of the rim is less than the radius of the axial body bore. In an embodiment, the system further comprises at least a first rest button having a threaded end having the first thread configuration and at least a second rest button having a threaded end having the second thread configuration.

DESCRIPTION OF THE PREFERRED EMBODIMENT(S)

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

At a high level, described herein is an air rest button system comprising a body element (201) and a plunger element (203) configured to accept a rest button. The plunger element (203) generally is configured to be inserted into a base (213) in the top of the body element (201). The plunger element (203) in turn has a bore or hole (211) therein configured to receiving an air rest button, which may be substituted for other air rest buttons, facilitating the modularity of the present system. These and other elements are described in further detail herein.

Figure 1A:
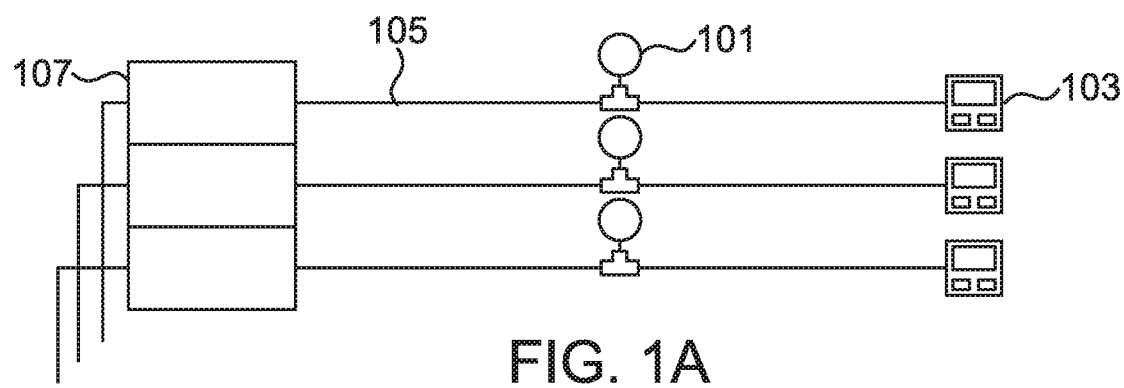
FIGS. 1A and 1B depict schematic diagrams of air rest button systems according to the present disclosure.
Figure 1B:
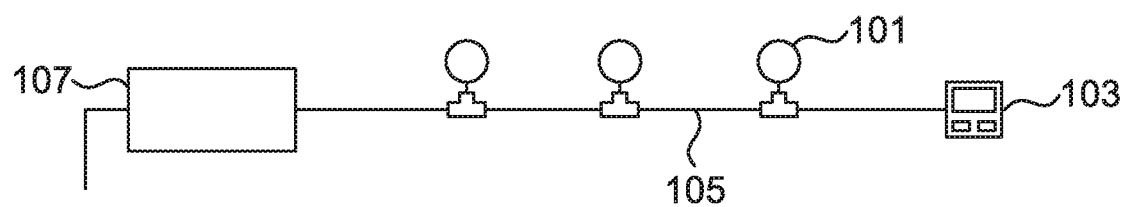

In the depicted embodiment of FIG. 1, a schematic diagram of an air rest button system is provided. In the depicted embodiment, one or more air rest button systems (101) are connected to an air source (107) via an air supply (105). The air supply is typically in the form of an airtight or nearly airtight supply line (105). The air rest button systems (101) are also connected via the air supply (105) to an air pressure sensing device (103). FIG. 1A depicts the assembly using a plurality of air rest button systems (101) arranged in parallel. FIG. 1B depicts a plurality of air rest button systems arranged in serial.

Figure 2A:
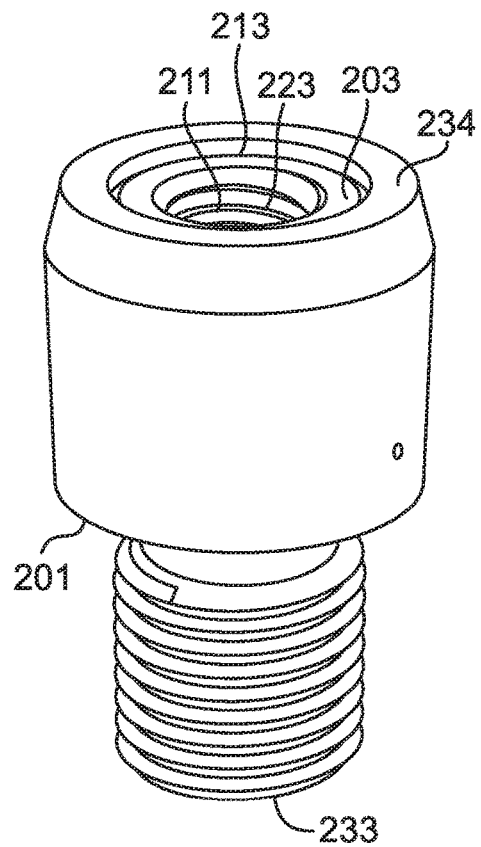
FIG. 2A depicts an isometric view of an assembled air rest button system according to the present disclosure.
Figure 2B:
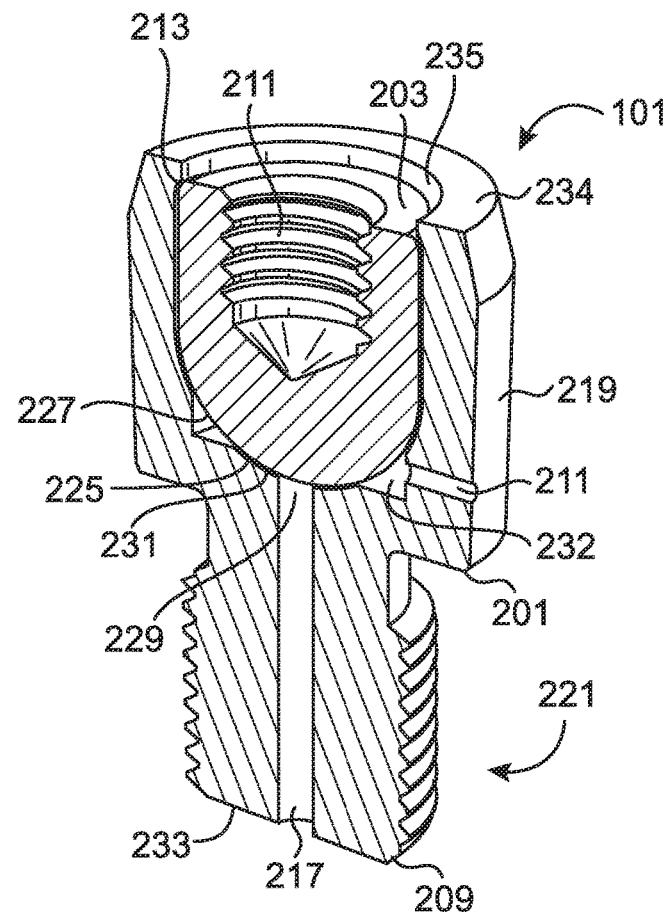
FIG. 2B depicts a cross-sectional view of the air rest button system of FIG. 2A.

FIG. 2B depicts an isometric cutaway diagram of an air rest button system (101) according to the present disclosure. In the depicted embodiment of FIG. 2B, the monolithic body element (201) comprises a top portion (219) and a bottom portion (221) rigidly attached thereto. The depicted top portion (219) is a generally cylindrical element surrounding or defining a hollow and generally cylindrical interior bore (213). The depicted bottom portion (221) is a threaded element configured for screwing into a fixturing plate or other machining surface. A channel (217) is disposed axially in the body element (201) and provides a fluid communication path from the bottom (231) of the bottom portion (221) through the bottom portion (221) and to the bottom of the bore (213). The depicted vent (211) is disposed near the bottom (232) of the bore (213). In the depicted embodiment, the radius of the bottom portion (221) is smaller than that of the top portion (219) to accommodate the radius of the plunger element (203). This is a design choice based upon manufacturing needs and intended use and, as can be seen in the depicted embodiment of FIGS. 3A and 3B, the body element (201) need not have two components at all and may be comprised of a construction of generally uniform radius.

The dimensions of the bore (213) are configured to correspond to the dimensions of the plunger element (203). As can be seen, when the body element (201) is installed in a fixture, air supplied to bottom (233) of the body element (201) passes through the channel (217) and applies pressure to the bottom (231) of the plunger element (203). In this configuration, as further described elsewhere herein, the pressure of the air applied to the bottom (231) of the plunger element (203) will tend to push the plunger element (231) out of the bore (213). This can cause the plunger element (203) to be propelled out of the body element (201). To retain the plunger element (203), the top (231) of the body element (201) may comprise an annular rim or lip (235) projecting a protruding radially inward towards the central axis of the body element (201). This lip (235) is configured to inhibit the plunger element (203) from exiting the bore (213) entirely. In an embodiment, a gasket, ring or seal (205) may be inserted between the top of the plunger element (203) and the underside of the lip (235). This provides both an improved air seal, while also cushioning the plunger element (203). When installed in the body element (201), the plunger element (203) is moveable along the axis of the body element (201). As described herein, the plunger element (203) moves in accordance with the supply of air pressure via channel (217).

The system (101) is used by installing the body element (201) into a fixture (109), installing the plunger element (203) within the bore (213), and optionally installing the seal (205) between the top of the plunger element (203) and the rim (235). An air supply (105) is then attached to the fixture (109) or to a nipple (207) or other connecting means at the bottom (233) of the body element (201) as described elsewhere herein.

Next, a rest button is inserted into the plunger bore (211). In this fashion, a plurality of rest buttons may be used as air rest buttons in conjunction with the present apparatus. This allows general purpose rest buttons to be converted into air rest buttons without requiring special purpose hardware for each individual rest button.

Figure 3A:
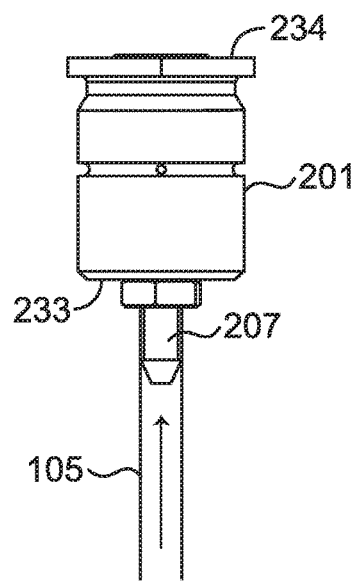
FIG. 3A depicts a side elevation view of an embodiment of an alternative embodiment of an air rest button system according to the present disclosure.
Figure 4:
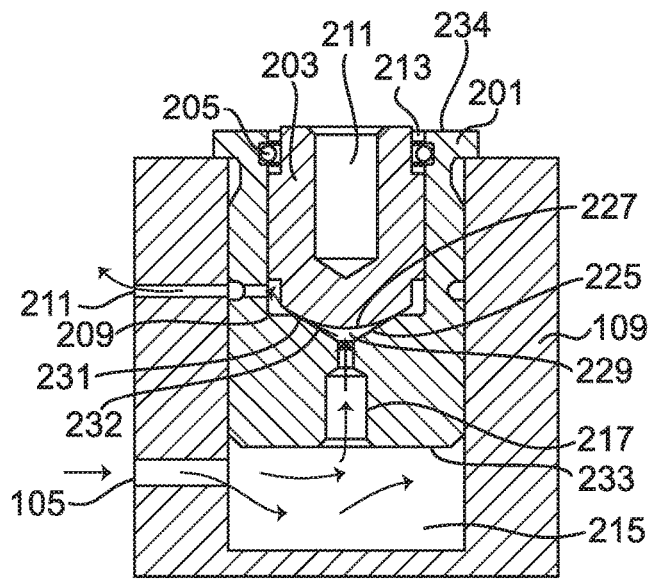
FIG. 4 depicts a cross-sectional view of an embodiment of an air rest button system according to the present disclosure.
Figure 3B:
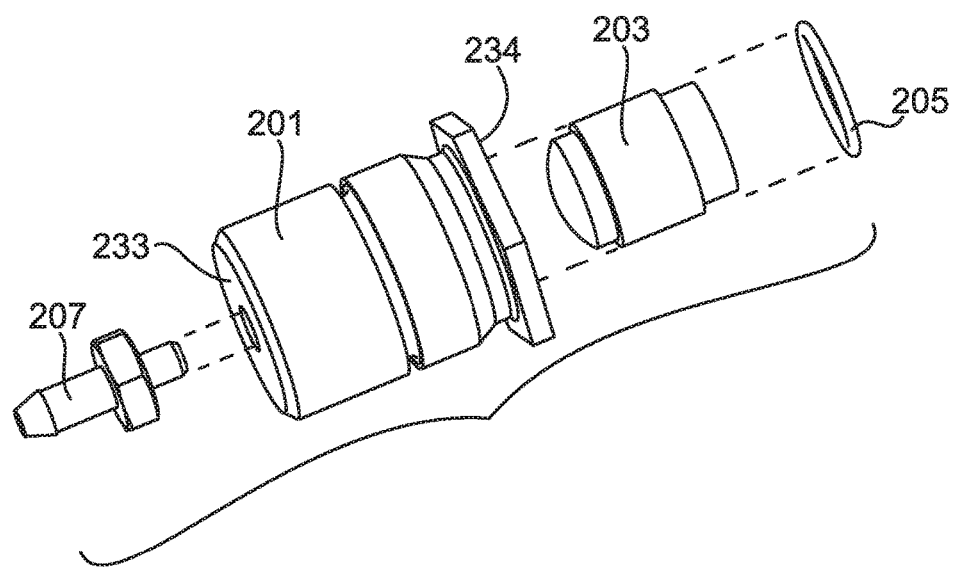
FIG. 3B depicts an exploded view of an air rest button system depicted in FIG. 3A.

The air supply (105) may be connected to the air rest button system (101) in a number of ways. In FIG. 3A, for example, the air supply (105) is connected to a nipple element (107) attached to a bottom end of the body (201). By contrast, in the depicted embodiment of FIG. 3B, the air supply (105) comprises a channel into a chamber (215) disposed beneath the body (201). In the depicted embodiment of FIG. 3B, air enters the chamber (215) via the air supply (105) and from there passes through a channel (217) disposed in the bottom (233) of the body element (201). The depicted channel (217) is in fluid communication with the chamber (215) and the bore (213) extending downward into the body element (201) from the top (234) of the body element (201). As can be seen in the depicted embodiments of FIGS. 2B and 3B, when the plunger element (203) is inserted into the bore (213), the plunger element (203) and the bore (213) are sized and shaped so that the bottom (231) of the plunger element (203) and the bottom (233) of the bore (213) form a chamber (229). In the depicted embodiments, this chamber (229) is in fluid communication with the air supply (105) via the channel (217). This allows air flow from the air supply (105) to pass through the channel (217) and accumulate in the chamber (229). As air accumulates in the chamber (229), the pressure applies upward force to the plunger (203), urging the plunger (203) towards the top (234) of the body element (201). From there, the air escapes the chamber (229) via a vent (211). After a time, this results in pressure equalization on the air supply (105), which can be detected by the pressure sensor (103).

The depicted vent (211) is a lateral channel in fluid communication with the chamber (229) and the atmosphere. As can be seen in the depicted embodiments of FIGS. 2B and 3B, the size and shape of the bore (213) and the bottom (231) of the plunger element (203) are mutually configured so that when the plunger element (203) is at its downward-most extent in the bore (213), at least a portion of the bottom (231) of the plunger element (203) contacts the bottom (232) of the bore (213) to form an air tight (or nearly air tight) ring or seal, inhibiting air in the chamber (229) from escaping via the vent (211). When the accumulated air pressure in the chamber (229) is effective to raise the plunger element (203), a fluid pathway from the chamber (229) to the vent (211) is opened, and air may escape. In the depicted embodiment of FIG. 2B, the chamber (229) is almost non-existent, essentially comprising the space directly beneath the bottom (231) of the plunger element (203), whereas in FIG. 3B, a small chamber (229) is formed beneath the bottom (231) of the plunger element (203) and the bottom (232) of the bore (213). These are design choices, and the functional behavior of the devices are similar.

In the depicted embodiments of FIGS. 2A, 2B, 3A, 3B, and 4, the plunger element (203) comprises a plunger bore (211) extending downward into the body of the plunger element (203) from the top thereof, and configured to accept a rest button. The depicted plunger element (203) is a generally cylindrical element having a rounded bottom (231) and a generally flat opposing top surface, with the plunger bore (211) extending axially into the plunger element (203) from the top. The depicted plunger bore (211) is not a through bore, but rather terminates at a point between the top and bottom (231) of the plunger element (203). The depicted plunger bore (211) of FIGS. 2A and 2B is threaded, allowing a rest button to be screwed into the plunger element (203). Other means and methods of inserting and connecting a rest button to the plunger element (203) will be evident to one of ordinary skill in the art. By way of example and not limitation, the air rest button may be pressed into the plunger.

When a rest button is inserted into plunger bore (211) and positioned, the plunger element (203) is forced downward toward the distal end of the body element (201). This in turn causes the bottom (231) to partially or entirely block the path of the air to the vent (211). This in turn causes air pressure to accumulate in the chamber (229) and air supply (105), which is detectable by the pressure sensor (103). The installer can monitor the pressure sensor (103) to confirm that the rest button is properly positioned.

Figure 5:
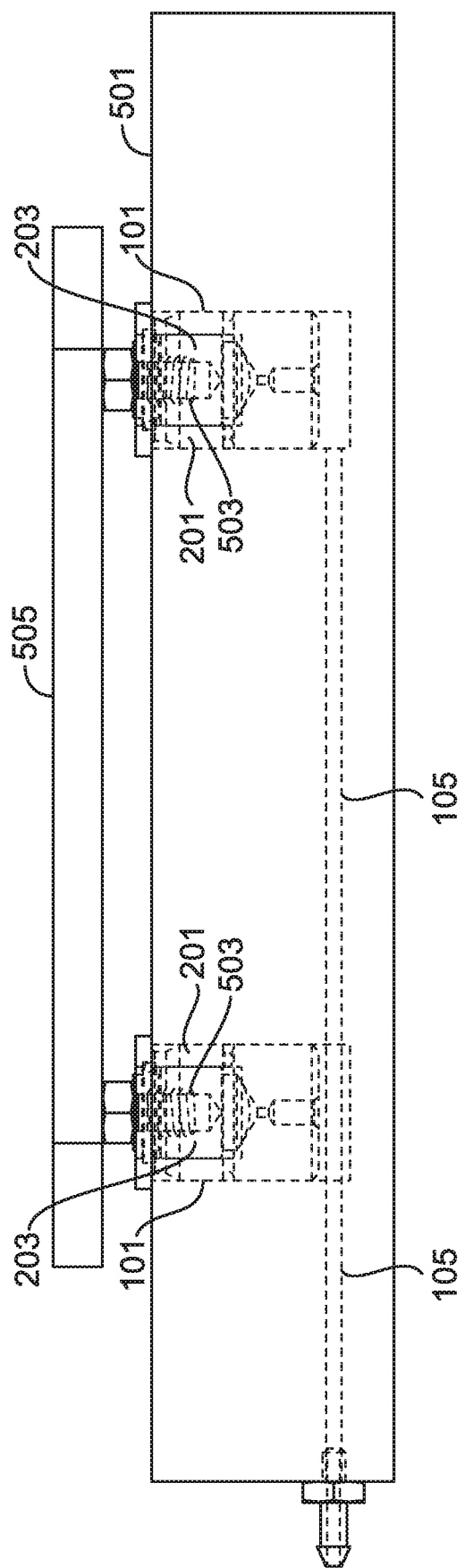
FIG. 5 depicts a cross-sectional view of an embodiment an air rest button system according to the present disclosure in use with a work piece.

FIG. 5 depicts an side elevation view of an embodiment of an air rest button system (101) according to the present disclosure holding a work piece in place. In the depicted embodiment, two different air rest button systems (101) are installed in a work surface or fixturing surface (501). For each, a body element (201) is inserted into a receiving cavity in the surface (501), a plunger element (203) is inserted into the body element (201) as described elsewhere herein, and a rest button (503) is inserted into the plunger element (203) as described elsewhere herein. A workpiece (505) is then affixed to the rest button (503) in the conventional manner known in the art.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. An air rest button system comprising:
a body element comprising a top side having an axial body bore disposed therein having an interior surface defining a generally cylindrical hollow interior having a radius, and an opposing bottom side having an axial channel disposed centrally and longitudinally therein, said top side further comprising a rim having an underside, said rim circumscribing said axial body bore and protruding radially towards a center axis thereof, said rim and said body element being monolithic;
a plunger element having a radius corresponding to said radius of said generally cylindrical hollow interior so that said plunger element slides through said axial body bore and is capable of contacting said interior surface of said axial body bore, said plunger element comprising a bottom side and an opposing top side having an axial plunger bore disposed therein and configured to accept a rest button; and
a gasket disposed in said axial body bore between said plunger element and said rim, said gasket abutting said rim and said plunger and forming an airtight seal between said rim and said plunger element.

2. The air rest button system of claim 1, further comprising an air supply in fluid communication with said axial channel.

3. The air rest button system of claim 2, further comprising a pressure sensor in fluid communication with said air supply.

4. The air rest button system of claim 1, where said plunger element is generally cylindrical.

5. The air rest button system of claim 1, wherein said plunger element comprises a first radius about a midpoint between said bottom side and said top side of said plunger element, and a second radius at said top side of said plunger element, said second radius being smaller than said first radius and configured to accommodate said gasket disposed to form an airtight seal between said plunger element and said axial body bore.

6. The air rest button system of claim 1, wherein said rim has a radius less than said radius of said cylindrical hollow interior.

7. A system for interchangeably using a plurality of rest buttons with a single air rest button system comprising:
a body element comprising a top side having an axial body bore disposed therein having an interior surface defining a generally cylindrical hollow interior having a radius, and an opposing bottom side having an axial channel disposed centrally and longitudinally therein, said top side further comprising a rim having an underside, said rim circumscribing said axial body bore and protruding radially towards a center axis thereof, said rim and said body element being monolithic;
a first plunger element having a radius corresponding to said radius of said generally cylindrical hollow interior so that said first plunger element slides through said axial body bore and is capable of contacting said interior surface of said axial body bore, said first plunger element comprising a bottom side and an opposing top side having an axial plunger bore disposed therein configured to accept a rest button having a threaded attaching element having a first thread configuration; and
a second plunger element having a radius corresponding to said radius of said generally cylindrical hollow interior so that said second plunger element slides through said axial body bore and is capable of contacting said interior surface of said axial body bore, said second plunger element comprising a bottom side and an opposing top side having a second axial plunger bore disposed therein configured to accept a rest button having a threaded attaching element having a second thread configuration different from said first thread configuration; and
a gasket disposed in said axial body bore between said first plunger element or said second plunger element, and said rim, said gasket abutting said rim and forming an airtight seal between said rim and said first plunger element or said second plunger element.

8. The system of claim 7, wherein said first plunger element and said second plunger element each comprise a first radius at about a midpoint between each respective bottom side and each respective top side and a second radius at each respective top side, said second radius being smaller than said first radius and said gasket selectively disposed on said second radius of said first plunger element or said second plunger element to form an airtight seal between said axial body bore and one of said first plunger element or said second plunger element.

9. The system of claim 7, further comprising at least a first rest button having a threaded end having said first thread configuration and at least a second rest button having a threaded end having said second thread configuration.

* * * * *